(12) United States Patent
Yoshizaki

(10) Patent No.: US 8,390,700 B2
(45) Date of Patent: Mar. 5, 2013

(54) IMAGING APPARATUS WITH COLORIMETRIC SENSOR

(75) Inventor: Kazunori Yoshizaki, Tokyo (JP)

(73) Assignee: Olympus Corporation, Tokyo (JP)

( * ) Notice: Subject to any disclaimer, the term of this patent is extended or adjusted under 35 U.S.C. 154(b) by 309 days.

(21) Appl. No.: 12/775,644

(22) Filed: May 7, 2010

(65) Prior Publication Data
US 2010/0289918 A1 Nov. 18, 2010

(30) Foreign Application Priority Data

May 18, 2009 (JP) ................................ 2009-120356

(51) Int. Cl.
*H04N 9/73* (2006.01)
*H04N 5/76* (2006.01)
*H04N 5/222* (2006.01)
*G06K 9/00* (2006.01)
*G03F 3/08* (2006.01)

(52) U.S. Cl. ............. 348/225.1; 348/231.6; 348/333.03; 382/167; 358/523

(58) Field of Classification Search ............... 348/223.1, 348/224.1, 231.6, 333.03; 382/167; 358/518, 358/523
See application file for complete search history.

(56) References Cited

U.S. PATENT DOCUMENTS

| | | | | |
|---|---|---|---|---|
| 6,175,693 B1 * | 1/2001 | Iida | ............... | 396/121 |
| 7,348,993 B2 * | 3/2008 | Stokes et al. | ................... | 345/589 |
| 7,365,778 B2 * | 4/2008 | Takeshita | ................... | 348/223.1 |
| 7,432,961 B2 * | 10/2008 | Takeshita | ................... | 348/227.1 |
| 7,474,339 B2 * | 1/2009 | Hoshuyama | ............... | 348/223.1 |
| 7,518,638 B2 * | 4/2009 | Furukawa | ................... | 348/223.1 |
| 7,656,458 B2 * | 2/2010 | Hoshuyama | ................... | 348/366 |
| 8,044,969 B2 * | 10/2011 | Osorio et al. | ................... | 345/604 |
| 8,149,294 B2 * | 4/2012 | Komiya et al. | ............. | 348/223.1 |
| 2003/0076424 A1 * | 4/2003 | Minakuti et al. | ........... | 348/223.1 |
| 2005/0105106 A1 * | 5/2005 | Haikin | ........................... | 358/1.9 |
| 2007/0064119 A1 | 3/2007 | Komiya et al. | | |
| 2007/0177029 A1 * | 8/2007 | Wada et al. | ................. | 348/222.1 |
| 2008/0025599 A1 * | 1/2008 | Cho et al. | ....................... | 382/162 |
| 2010/0220211 A1 * | 9/2010 | Komiya et al. | ............. | 348/223.1 |
| 2010/0238361 A1 * | 9/2010 | Tanaka et al. | ................ | 348/738 |

FOREIGN PATENT DOCUMENTS

| | | | |
|---|---|---|---|
| JP | 06339147 A | * | 12/1994 |
| JP | 2003244464 A | * | 8/2003 |
| JP | 2004-180330 | | 6/2004 |
| JP | 2005257374 A | * | 9/2005 |
| JP | 2005-341175 | | 12/2005 |

* cited by examiner

*Primary Examiner* — John Villecco
(74) *Attorney, Agent, or Firm* — Scully, Scott, Murphy & Presser, P.C.

(57) ABSTRACT

An imaging apparatus includes: a display unit for displaying color image data acquired by the imaging unit; a colorimetric position acquisition unit for acquiring colorimetric position data corresponding to a colorimetric part selected by a user in the image data displayed on the display unit; a colorimetric position data record unit for recording the colorimetric position data; a light source; a colorimetric unit, provided near the light source, for performing a colorimetric process at a colorimetric instruction from the user, and acquiring colorimetric data as a result of the colorimetric process; a colorimetric data record unit for recording the colorimetric data; and a storage unit for associating the image data displayed on the display unit, the colorimetric position data recorded on the colorimetric position data record unit, and the colorimetric data recorded on the colorimetric data record unit, and storing the data.

9 Claims, 18 Drawing Sheets

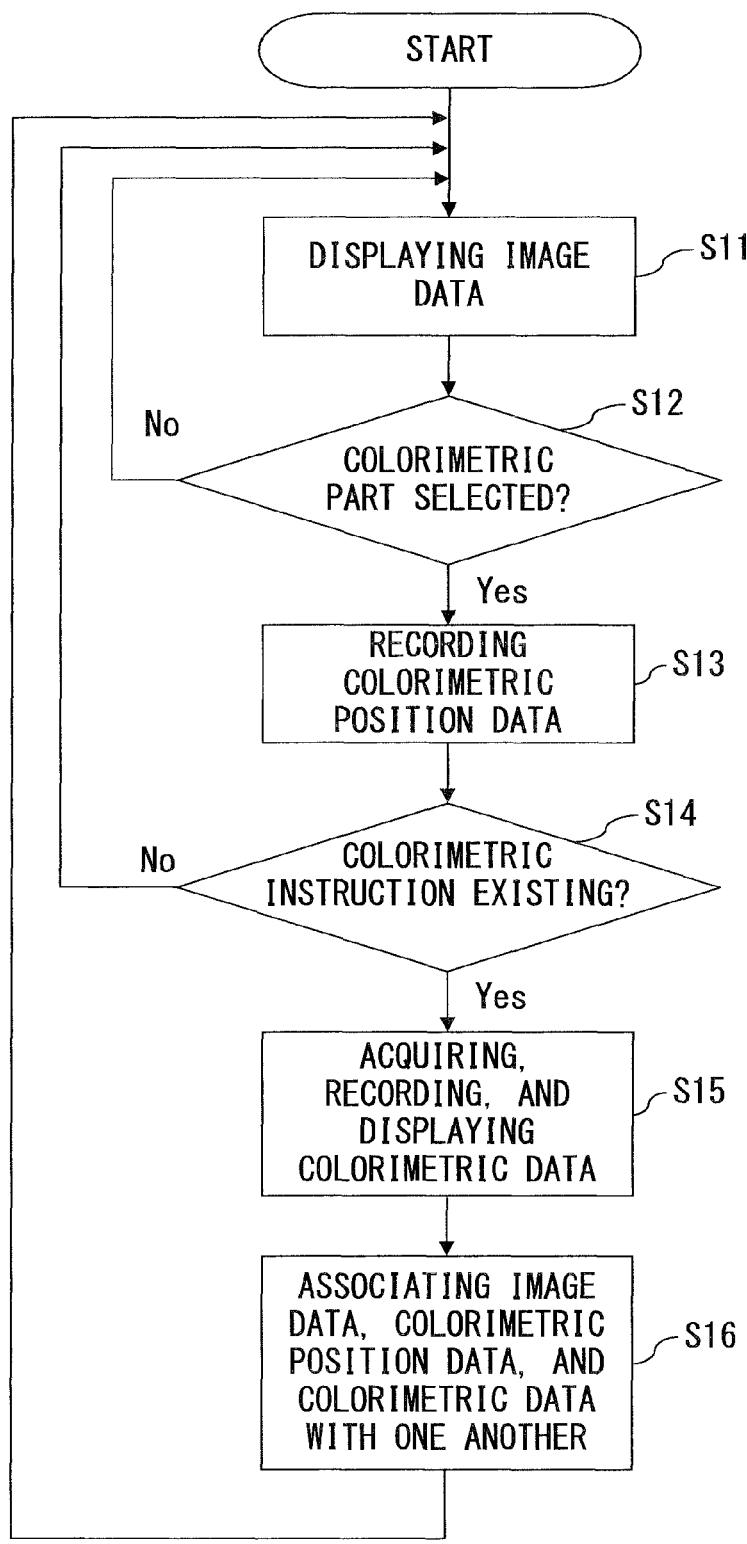
F I G. 2

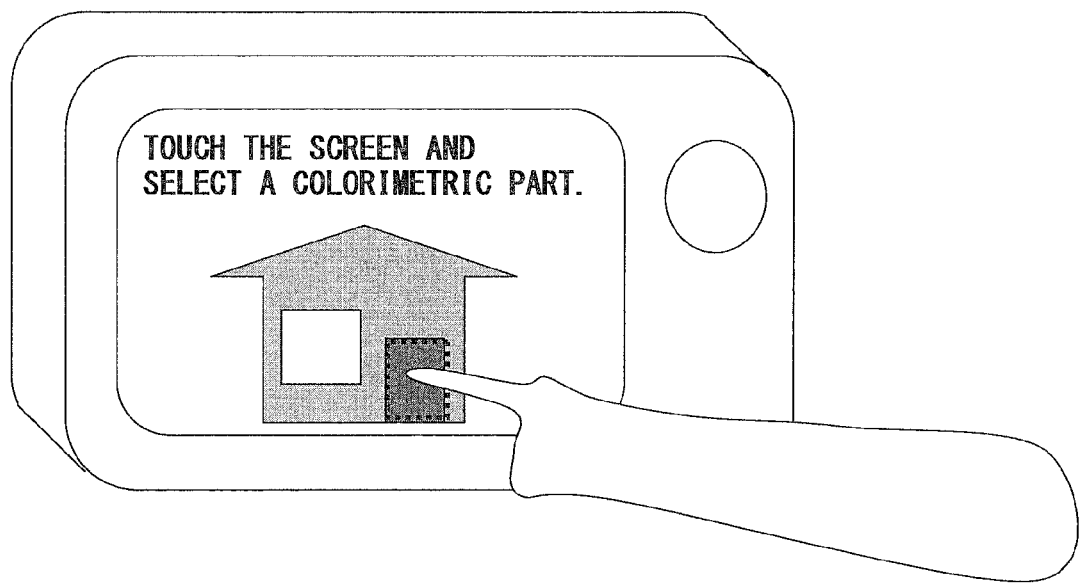
F I G. 5

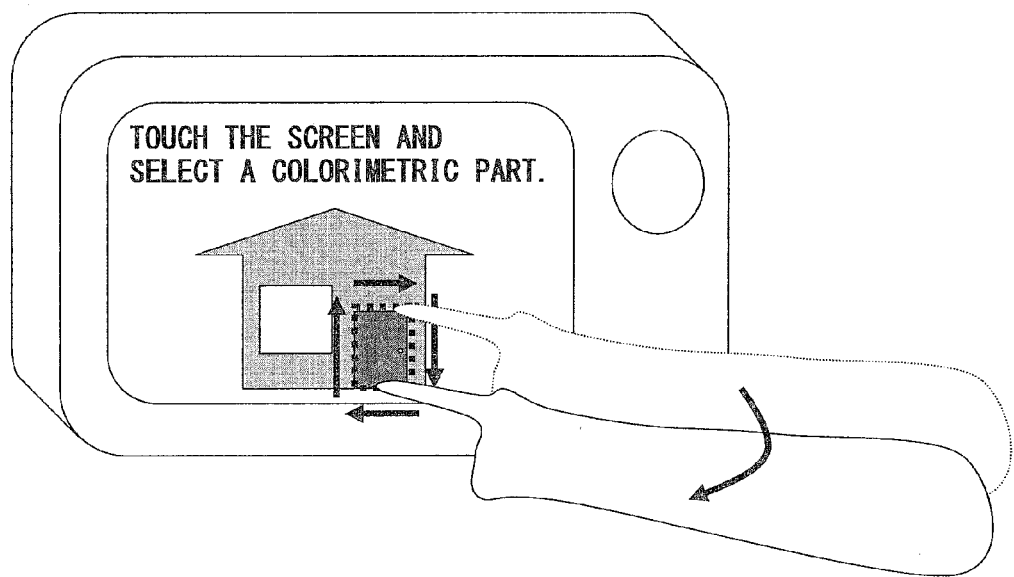
F I G. 7

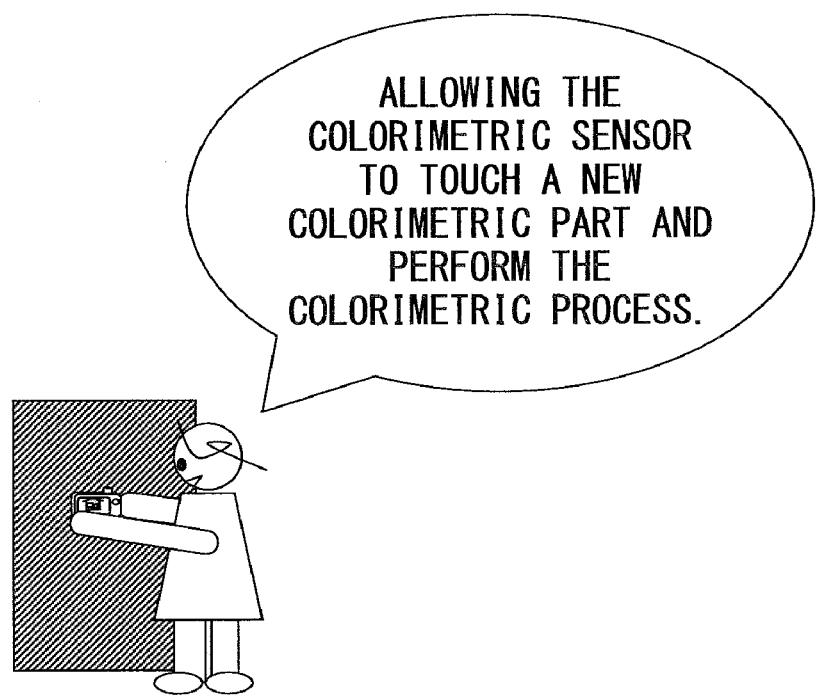
F I G. 1 1 D
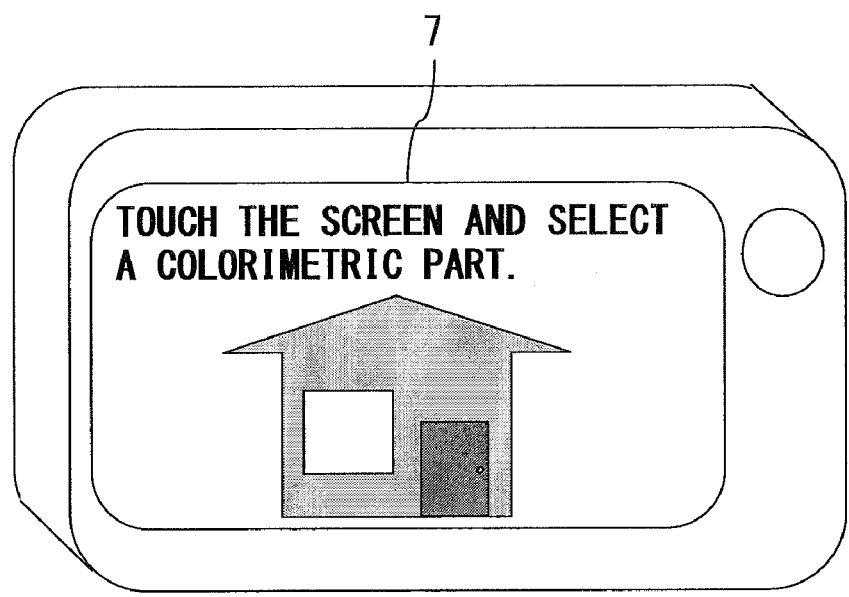
F I G. 1 1 E

IMAGING APPARATUS WITH COLORIMETRIC SENSOR

CROSS REFERENCE

This application is based upon and claims the benefit of priority from the prior Japanese Patent Application No. 2009-120356, filed May 18, 2009, the entire contents of which are incorporated herein by reference.

FIELD

The present invention relates to an imaging apparatus provided with a colorimetric sensor.

BACKGROUND

Conventionally, a designer, a color coordinator, etc. who have performed chromatic design conduct chromatic management in many fields. For example, the Japanese Laid-open Patent Publication No. 2005-341175 proposes a shooting system capable of correcting color of a shot image with high accuracy. In medical clinics of dermatologic and dental clinics, affected part data is acquired by a colorimeter and shot by an RGB color image pickup device, and a color correction is made on a resultant shot image, thereby realizing correct color reproduction. In the chromatic management, for example, a color coordinator uses a color chart and colorimetric equipment such as a spectrometer, a colorimeter, etc. In addition, in the field in which chromatic design is performed, a digital camera is often used in shooting an object for the chromatic design. For example, the Japanese Laid-open Patent Publication No. 2004-180330 proposes a digital camera capable of performing a color correction with high accuracy on an acquired image based on a color component value detected by a portable colorimeter.

A digital camera has recently been developed as a higher definition and less expensive camera. Correspondingly, there are an increasing number of applications in many fields. The digital camera has the merits of easily acquiring an image, and confirming an image immediately after a capturing process while it has the problem that the accuracy of the color correction is low, thereby the same subjects indicate different colors in captured images each time a shooting operation is performed. The accuracy of color correction by the digital camera can be degraded for various reasons.

Furthermore, a system for associating each colorimetric part to be processed by chromatic design in a captured image on which a color coordinator is to perform the chromatic design with chromatic information has been conventionally realized by a plurality of equipment units (for example, an imaging apparatus, colorimetric equipment, a computer, etc.).

However, the system for associating the colorimetric part of the captured image with the chromatic information has the problem that the system is executed by a plurality of equipment units and becomes highly complicated.

SUMMARY

The imaging apparatus according to the present invention includes an imaging unit for acquiring color image data of a subject, a display unit for displaying image data acquired by the imaging unit, a colorimetric position acquisition unit for acquiring colorimetric position data corresponding to a colorimetric part selected by a user in the image data displayed on the display unit, a colorimetric position data record unit for recording the colorimetric position data, a light source, a colorimetric unit provided near the light source, performing a colorimetric process at a colorimetric instruction from the user, and acquiring colorimetric data as a result of the colorimetric process; a colorimetric data record unit for recording the colorimetric data, and a storage unit for associating the image data displayed on the display unit, the colorimetric position data stored in the colorimetric position data record unit and the colorimetric data stored in the colorimetric data record unit, and storing the data.

BRIEF DESCRIPTION OF DRAWINGS

FIG. 2 is a flowchart for describing the operation of the imaging apparatus according to the first embodiment;

FIG. 5 is an explanatory view of an operation of a user;

FIG. 7 is an explanatory view of an operation of a user;

FIG. 11D is an explanatory view of another operation of a user who operates the imaging apparatus according to the second embodiment;

FIG. 11E is an explanatory view of another operation of a user who operates the imaging apparatus according to the second embodiment;

DESCRIPTION OF EMBODIMENTS

First Embodiment

Figure 1:
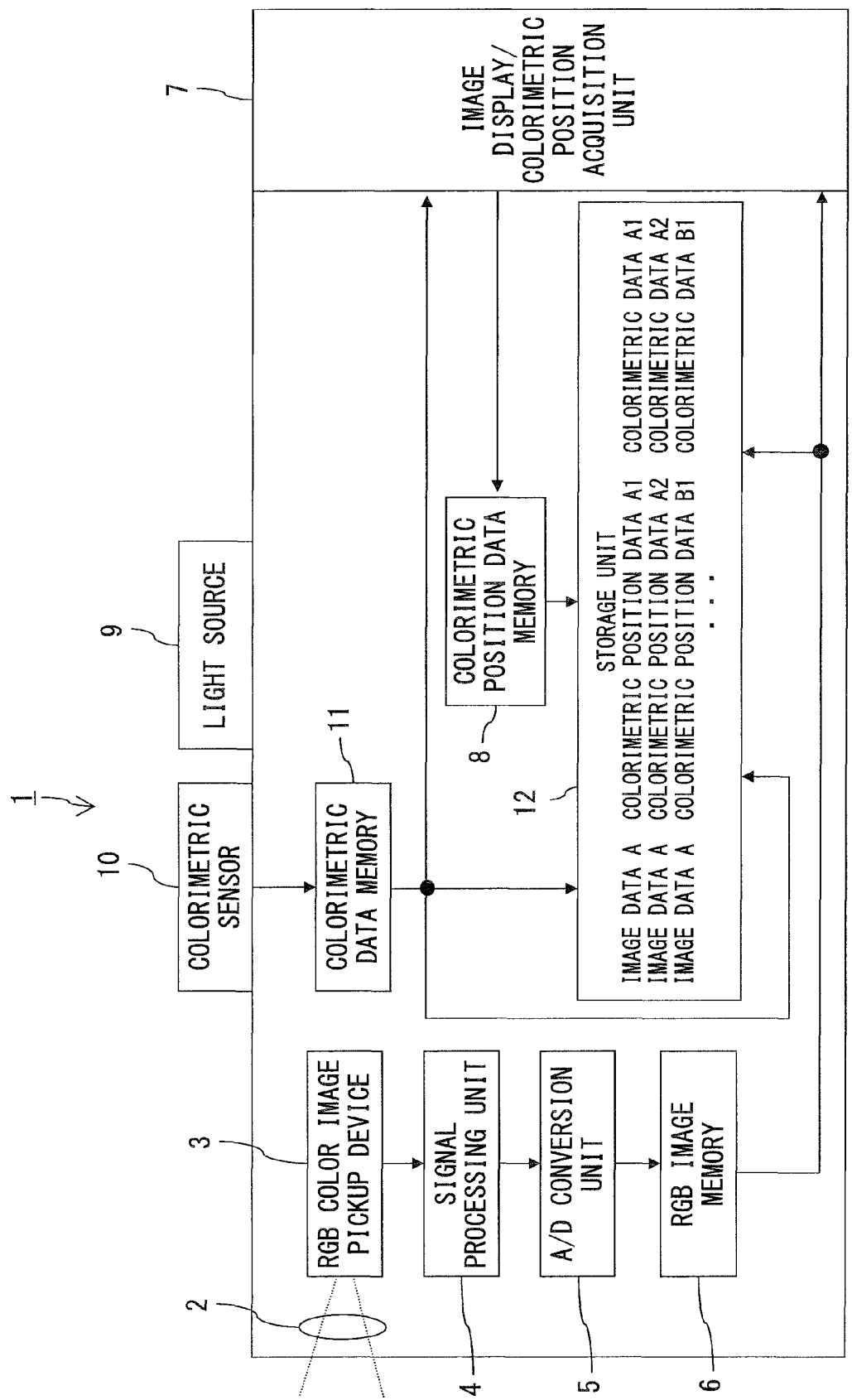
FIG. 1 illustrates the imaging apparatus according to the first embodiment of the present invention.

FIG. 1 illustrates the imaging apparatus according to the first embodiment of the present invention.

A imaging apparatus 1 illustrated in FIG. 1 is configured by a taking lens 2, an RGB color image pickup device 3, a signal processing unit 4, an A/D conversion unit 5, RGB image memory 6, an image display/colorimetric position acquisition unit 7, colorimetric position data memory 8, a light source 9, a colorimetric sensor 10, colorimetric data memory 11, and a storage unit 12.

The colorimetric sensor 10 can be built in the imaging apparatus 1, and also can be removable from the imaging apparatus 1.

The image display/colorimetric position acquisition unit 7 is supposed to be configured by a touch panel. Thus, a user can easily select a colorimetric part in the image data displayed on the image display/colorimetric position acquisition unit 7.

At a capture instruction from the user, the imaging apparatus 1 according to the first embodiment converts a subject image formed on the RGB color image pickup device 3 by the taking lens 2 into an electric signal by the RGB color image pickup device 3. Next, the imaging apparatus 1 performs image processing on the electric signal by the signal processing unit 4 to generate image data, and converts the image data into digital data by the A/D conversion unit 5. Next, the imaging apparatus 1 temporarily stores the image data in the RGB image memory 6, stores the data in the storage unit 12, and displays it on the image display/colorimetric position acquisition unit 7

In addition, at a an instruction to display predetermined image data from a user, the imaging apparatus 1 according to the first embodiment reads the image data from the storage unit 12, and displays the data on the image display/colorimetric position acquisition unit 7.

It is assumed that the image display/colorimetric position acquisition unit 7 is provided with the function of scaling up or down the image data being displayed by the operation of the user.

FIG. 2 is a flowchart for describing the operation of the imaging apparatus 1 according to the first embodiment. Described below is the operation of the imaging apparatus 1 in and after the process of displaying image data after the capture instruction or the display instruction from the user.

First, after displaying the image data on the image display/colorimetric position acquisition unit 7 (S11), the imaging apparatus 1 determines whether or not the user has selected a colorimetric part in the image data being displayed on the image display/colorimetric position acquisition unit 7 (S12).

If it is determined that the colorimetric part has been selected (YES in S12), the imaging apparatus 1 acquires the colorimetric position data corresponding to the colorimetric part by the image display/colorimetric position acquisition unit 7, and records the colorimetric position data on the colorimetric position data memory 8 (S13).

Next, the imaging apparatus 1 determines whether or not there has been a colorimetric instruction from the user (S14).

If it is determined that there has been a colorimetric instruction (YES in S14), the imaging apparatus 1 performs a colorimetric process by the colorimetric sensor 10, and acquires resultant colorimetric data. Afterwards, the imaging apparatus 1 records the colorimetric data on the colorimetric data memory 11 and displays the data on the image display/colorimetric position acquisition unit 7 (S15).

Next, the imaging apparatus 1 associates the image data stored on the storage unit 12 and displayed on the image display/colorimetric position acquisition unit 7, the colorimetric position data recorded on the colorimetric position data memory 8, and the colorimetric data recorded on the colorimetric data memory 11 with one another and stores them on the storage unit 12 (S16), and control is returned to S11. In this case, if a new capture or display instruction is detected, the processes in S11 threshold S16 are performed on the image data corresponding to the instruction. If the processes in S11 through S16 are performed again on the image data being displayed on the image display/colorimetric position acquisition unit 7, new colorimetric position data and colorimetric data are associated with the image data.

Thus, the user can perform chromatic design etc. using the colorimetric part of the image data stored on the storage unit 12 and the colorimetric data corresponding to the colorimetric part. In the imaging apparatus 1 according to the first embodiment, the light source 9 is provided near the colorimetric sensor 10. Therefore, the user can obtain the color of an object at the colorimetric part independent of external light based on the colorimetric data and the spectral distribution of the light source 9.

FIGS. 3A through 3F illustrate an example of an operation of a user who operates the imaging apparatus 1 according to the first embodiment.

Figure 3A:
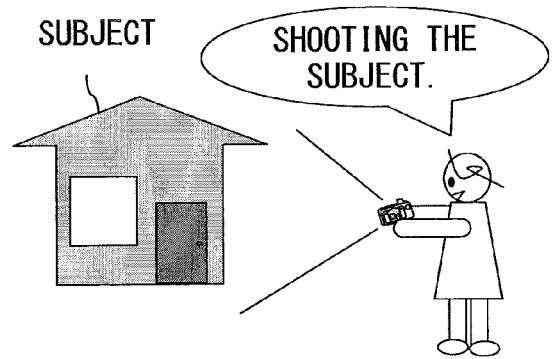
FIG. 3A is an explanatory view of an operation of a user who operates the imaging apparatus according to the first embodiment.
Figure 3B:
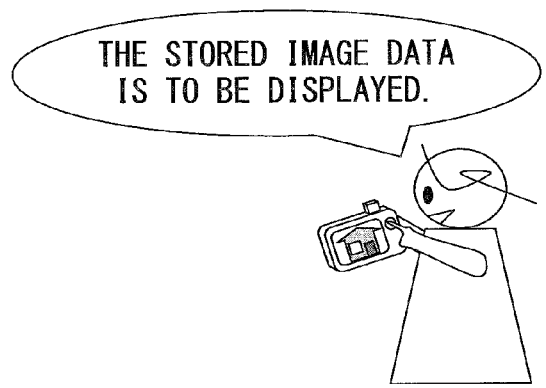
FIG. 3B is an explanatory view of an operation of a user who operates the imaging apparatus according to the first embodiment.
Figure 3C:
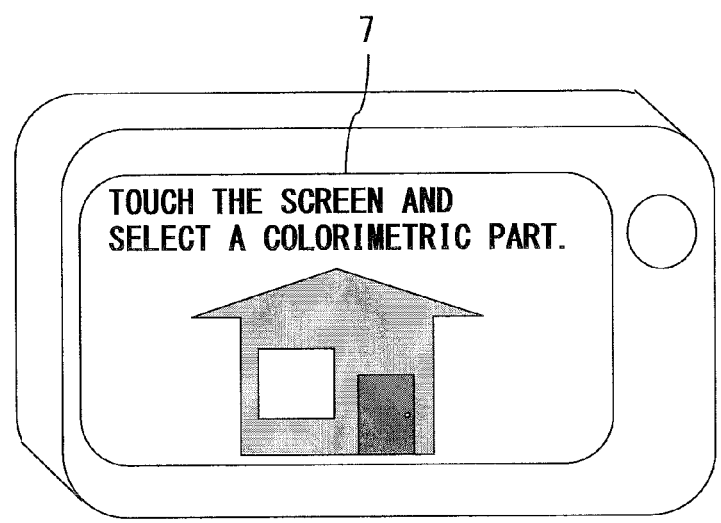
FIG. 3C is an explanatory view of an operation of a user who operates the imaging apparatus according to the first embodiment.

First, as illustrated in FIG. 3A, the user shoots a "house" as a subject by, for example, pressing a release button not illustrated in the attached drawings. Otherwise, as illustrated in FIG. 3B, the user selects image data obtained by capturing the "house" from the image data stored on the storage unit 12 as the image data displayed on the image display/colorimetric position acquisition unit 7. Then, the image data A as illustrated in FIG. 3C is displayed on the image display/colorimetric position acquisition unit 7. In this case, as a message for allowing the user to select the colorimetric part, for example, as illustrated in FIG. 3C, the message "Touch the screen and select a colorimetric part." can be displayed on the image display/colorimetric position acquisition unit 7.

Figure 3D:
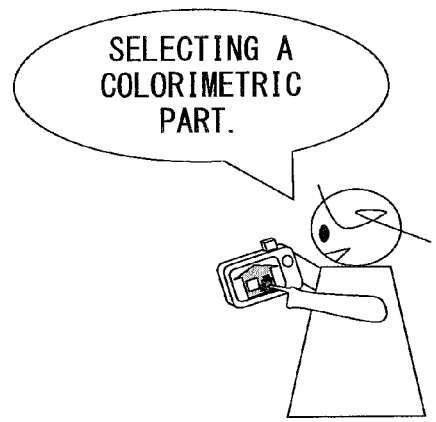
FIG. 3D is an explanatory view of an operation of a user who operates the imaging apparatus according to the first embodiment.
Figure 3E:
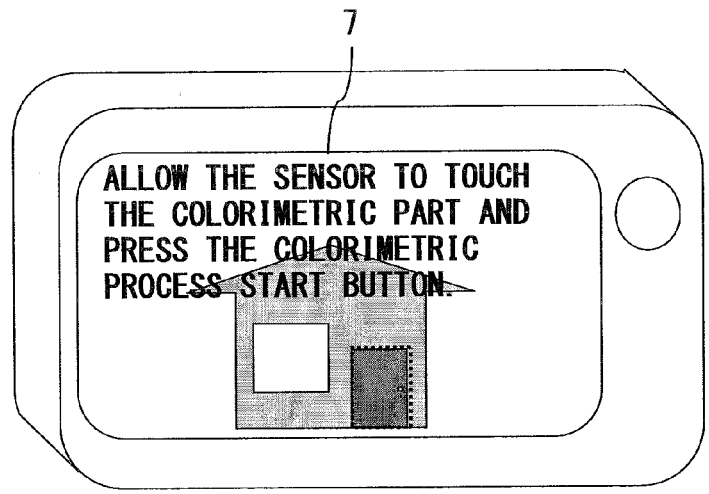
FIG. 3E is an explanatory view of an operation of a user who operates the imaging apparatus according to the first embodiment.

Next, as illustrated in FIG. 3D, the user selects a "door" as a colorimetric part in the image data A displayed on the image display/colorimetric position acquisition unit 7 by touching the "door" by his or her finger. Then, the image display/colorimetric position acquisition unit 7 obtains the colorimetric position data A1 corresponding to the "door", and the colorimetric position data A1 is recorded on the colorimetric position data memory 8. In this case, as a message for allowing the user to start a colorimetric process, for example, as illustrated in FIG. 3E, the colorimetric part selected by the user can be enclosed by broken lines. The user can confirm by the broken lines that the "door" has been selected as a colorimetric part. In addition, for example, as illustrated in FIG. 3E, the message "Allow the sensor to touch the colorimetric part and press the colorimetric process start button." can be displayed on the image display/colorimetric position acquisition unit 7.

Figure 3F:
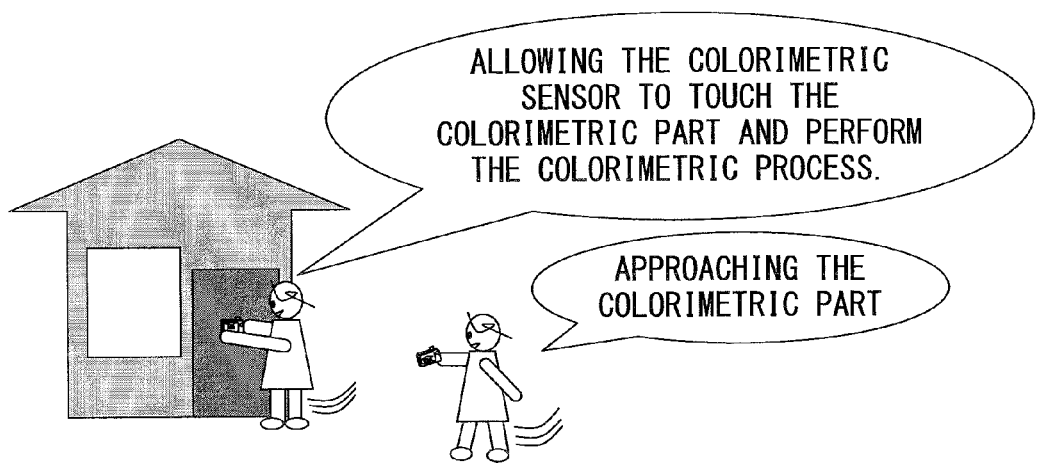
FIG. 3F is an explanatory view of an operation of a user who operates the imaging apparatus according to the first embodiment.

Next, as illustrated in FIG. 3F, the user moves to the "door", allows the colorimetric sensor 10 to contact the "door", and presses the colorimetric process start button not illustrated in the attached drawings. Then, the colorimetric sensor 10 acquires the colorimetric data A1, and the colorimetric data A1 is recorded on the colorimetric data memory 11.

Thus, the image data A, the colorimetric position data A1, and the colorimetric data A1 are associated with one another and stored on the storage unit 12.

When the user selects a new colorimetric part in the same image data A, the colorimetric position data A2 corresponding to the colorimetric part is recorded on the colorimetric position data memory 8. Then, if the user presses the colorimetric process start button, the colorimetric data A2 is recorded on the colorimetric data memory 11, and the image data A, the colorimetric position data A2, and the colorimetric data A2 are associated with one another and stored on the storage unit 12.

When the user selects a colorimetric part of different image data B, the colorimetric position data B1 corresponding to the colorimetric part is recorded on the colorimetric position data memory 8. Then, the user presses the colorimetric process start button, the colorimetric data B1 is recorded on the colorimetric data memory 11, and the image data B, the colorimetric position data B1, and the colorimetric data B1 are associated with one another and stored on the storage unit 12.

Figure 4:
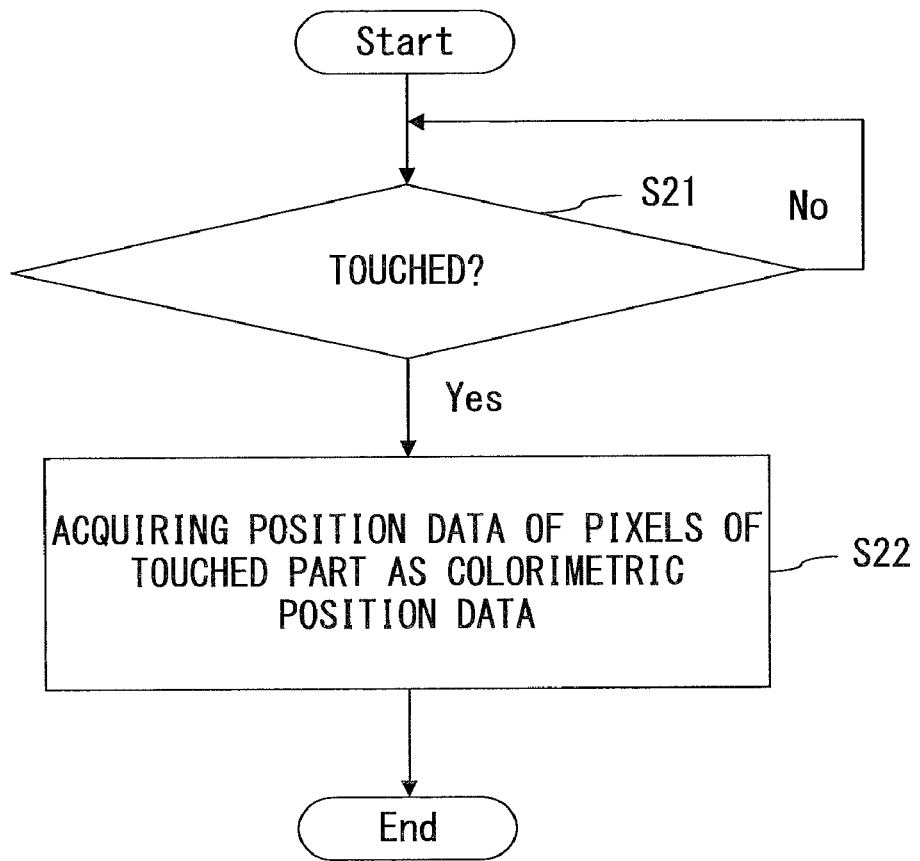
FIG. 4 is a flowchart for describing an example of an operation of an image display/colorimetric position acquisition unit when acquiring colorimetric position data.

FIG. 4 is a flowchart for describing an example of an operation of the image display/colorimetric position acquisition unit 7 when acquiring colorimetric position data.

First, the image display/colorimetric position acquisition unit 7 determines whether or not the user has touched as illustrated in FIG. 5 (S21).

If it is determined that the user has touched (YES in S21), then the image display/colorimetric position acquisition unit 7 acquires all pixels of position data of the color similar to the color of the touched part as colorimetric position data (S22). The similar color refers to that, for example, the tint, the lightness, or the color saturation at the pixel of the touched part is within a predetermined range.

Figure 6:
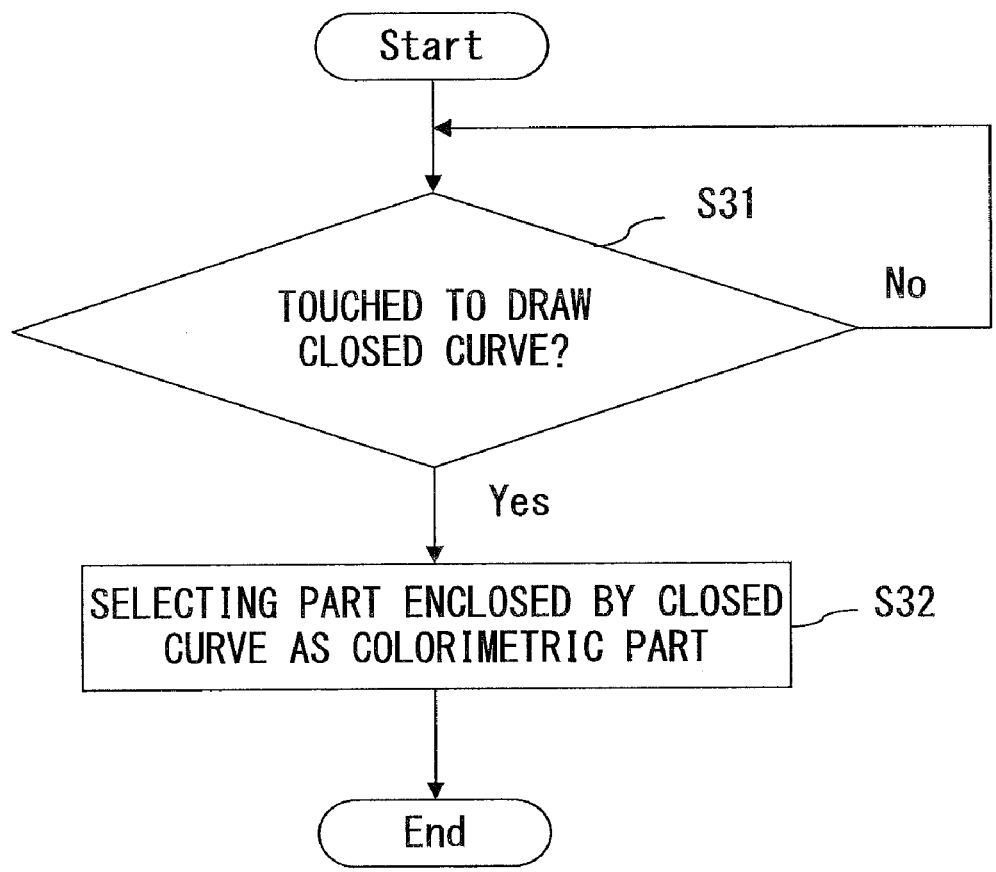
FIG. 6 is a flowchart for describing another example of an operation of an image display/colorimetric position acquisition unit when acquiring colorimetric position data.

FIG. 6 is a flowchart for describing another example of an operation of the image display/colorimetric position acquisition unit 7 when acquiring colorimetric position data.

First, the image display/colorimetric position acquisition unit 7 determines whether or not the user has touched to draw a closed curve as illustrated in FIG. 7 (S31).

If it is determined that the user has touched to draw a closed curve (YES in S31), the image display/colorimetric position acquisition unit 7 acquires the position data of all pixels of the drawn closed curve as colorimetric position data (S32).

The user can select a colorimetric part by moving a cursor displayed on the image display/colorimetric position acquisition unit 7 by operating an operation button not illustrated in the attached drawings. In this case, the image display/colorimetric position acquisition unit 7 can be configured by a component other than a touch panel.

According to the imaging apparatus 1 of the first embodiment, a user can select a colorimetric part in the image data displayed on the image display/colorimetric position acquisition unit 7, and then perform a colorimetric process by allowing the colorimetric sensor 10 to touch the colorimetric part, thereby associating the colorimetric part of the image data with the colorimetric data and storing them on the storage unit 12. Thus, according to the imaging apparatus 1 of the first embodiment, the colorimetric part of the image data and the chromatic information can be associated with each other with a simple configuration.

Second Embodiment

Figure 8:
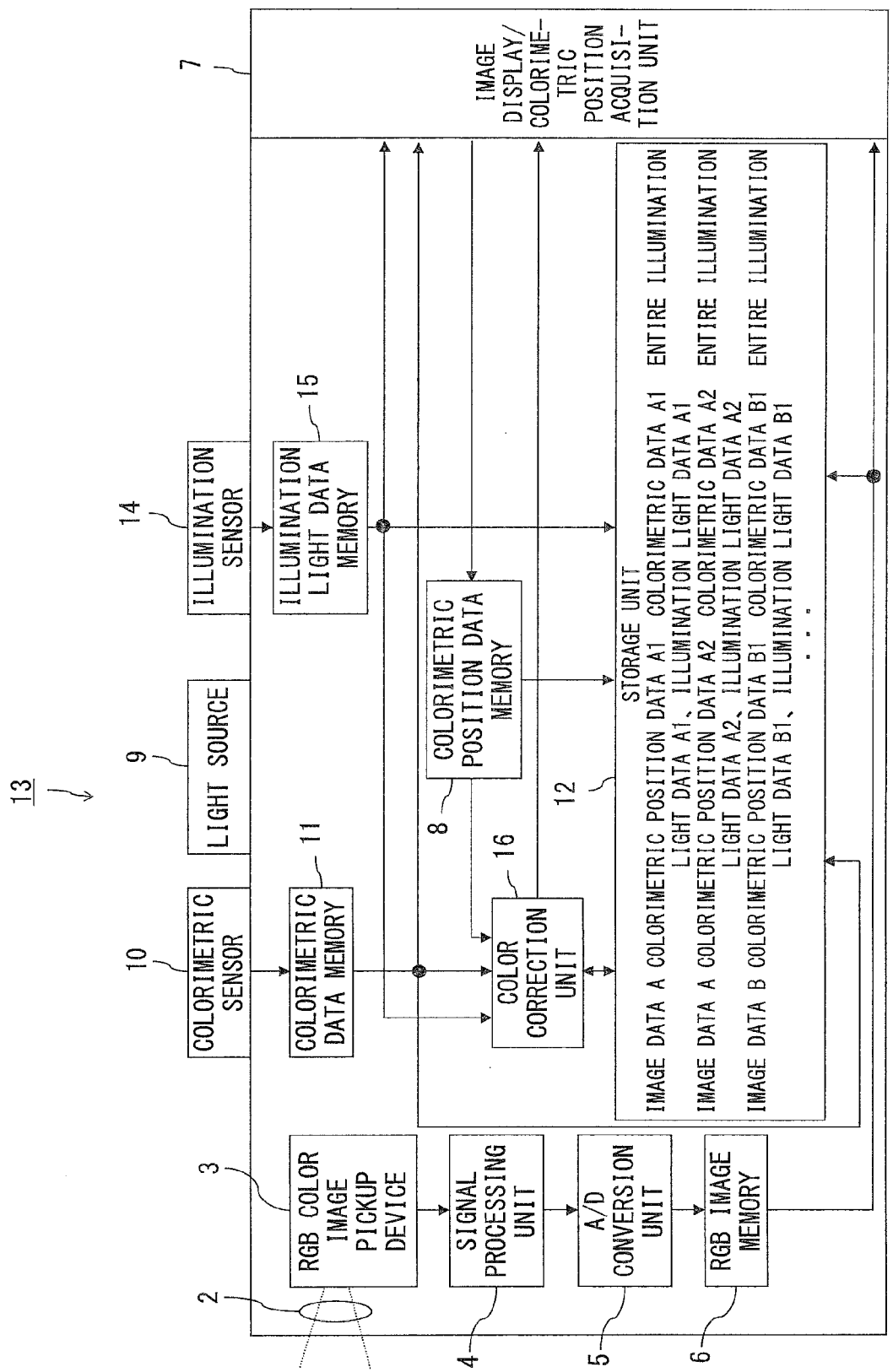
FIG. 8 illustrates the imaging apparatus according to the second embodiment of the present invention.

FIG. 8 illustrates the imaging apparatus according to the second embodiment of the present invention. The same configuration as the configuration in FIG. 1 is assigned the same reference numeral.

An imaging apparatus 13 illustrated in FIG. 8 is configured by the taking lens 2, the RGB color image pickup device 3, the signal processing unit 4, the A/D conversion unit 5, the RGB image memory 6, the image display/colorimetric position acquisition unit 7, the colorimetric position data memory 8, the light source 9, the colorimetric sensor 10, the colorimetric data memory 11, the storage unit 12, an illumination sensor 14, illumination light data memory 15, and a color correction unit 16. The colorimetric sensor 10 and the illumination sensor 14 can be configured such that more spectral information than the RGB color image pickup device 3 can be acquired. For example, each of the colorimetric sensor 10 and the illumination sensor 14 can be configured by a spectral colorimeter for detecting spectral information. Thus, since the image data can be color corrected using the spectral information, more correct color reproduction can be realized. Each of the colorimetric sensor 10 and the illumination sensor 14 can also be configured by a chromatic colorimeter for detecting chromatic information. Thus, since the color and the illumination light of the colorimetric part can be acquired by the chromatic information, the calculation of color correction can be easily performed as compared with the color correction of the image data according to the spectral information. Furthermore, each of the colorimetric sensor 10 and the illumination sensor 14 can also be configured by an independent device, and by a common device. When they are configured by a common device, one single sensor can be used, thereby reducing the entire cost.

As with the imaging apparatus 1 according to the first embodiment, upon receipt of a capture instruction from a user, the imaging apparatus 13 according to the second embodiment converts the subject image formed by the taking lens 2 on the RGB color image pickup device 3 into an electric signal by the RGB color image pickup device 3. Next, the imaging apparatus 13 performs image processing on the electric signal by the signal processing unit 4 to generate image data, and converts the image data into digital data by the A/D conversion unit 5. Next, the imaging apparatus 13 temporarily stores the image data on the RGB image memory 6, then stores it on the storage unit 12, and displays it on the image display/colorimetric position acquisition unit 7. In this case, the imaging apparatus 13 acquires the entire illumination light data by the illumination sensor 14, associates the entire illumination light data with the image data being displayed, and stores the resultant data on the storage unit 12.

In addition, as with the imaging apparatus 1 according to the first embodiment, upon receipt of an instruction to display predetermined image data from a user, the imaging apparatus 13 according to the second embodiment reads the image data from the storage unit 12, and displays the image data on the image display/colorimetric position acquisition unit 7.

Figure 9:
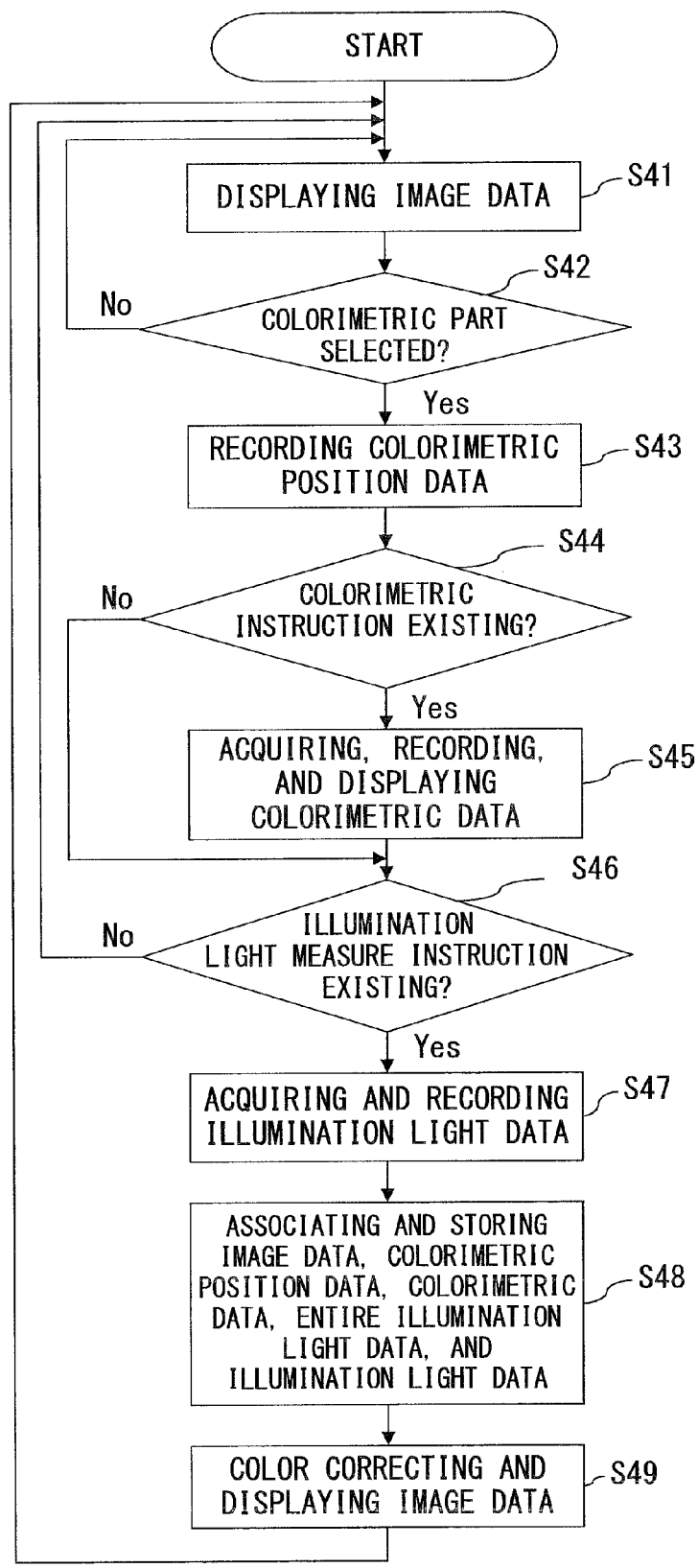
FIG. 9 is a flowchart for describing the operation of the imaging apparatus according to the second embodiment.

FIG. 9 is a flowchart for describing the operation of the imaging apparatus 13 according to the second embodiment. Described below is the operation of the imaging apparatus 13 after the process of displaying the image data after a capture instruction or a display instruction from a user.

First, the imaging apparatus 13 displays the image data on the image display/colorimetric position acquisition unit 7 (S41), and then determines whether or not the user has selected a colorimetric part in the image data being displayed on the image display/colorimetric position acquisition unit 7 (S42).

If it is determined that the colorimetric part has been selected (YES in S42), the imaging apparatus 13 acquires the colorimetric position data corresponding to the colorimetric part by the image display/colorimetric position acquisition unit 7, and records the colorimetric position data on the colorimetric position data memory 8 (S43).

Next, the imaging apparatus 13 determines whether or not a colorimetric instruction has been received from the user (S44).

If it is determined that no colorimetric instruction has been received (NO in S44), the imaging apparatus 13 performs the process in step S46.

On the other hand, if it is determined that the colorimetric instruction has been received (YES in S44), the imaging apparatus 13 performs the colorimetric process by the colorimetric sensor 10, acquires resultant colorimetric data, records the colorimetric data on the colorimetric data memory 11, and displays the colorimetric data on the image display/colorimetric position acquisition unit 7 (S45).

Next, the imaging apparatus 13 determines whether or not there has been an illumination light measure instruction from the user (S46).

If it is determined that no illumination light measure instruction has been received (NO in S46), the imaging apparatus 13 returns control to S41.

On the other hand, if it is determined that the illumination light measure instruction has been received (YES in S46), the imaging apparatus 13 performs the illumination light measuring process by the illumination sensor 14, the illumination light data as the result of the colorimetric process is acquired, and the illumination light data is recorded on the illumination light data memory 15 (S47).

Next, the imaging apparatus 13 associates the image data stored on the storage unit 12 and displayed on the image display/colorimetric position acquisition unit 7, the colorimetric position data recorded on the colorimetric position data memory 8, the colorimetric data recorded on the colorimetric data memory 11, the entire illumination light data stored on the storage unit 12, and the illumination light data recorded on the illumination light data memory 15 with one another, and stores them on the storage unit 12 (S48).

The imaging apparatus 13 then performs using the colorimetric position data and the colorimetric data a color correction by the color correction unit 16 on the colorimetric part of the image data being displayed and associated with the colorimetric position data and the colorimetric data. In addition, the imaging apparatus 13 performs by the color correction unit 16 using the colorimetric position data and the illumination light data the color correction on the colorimetric part of the image data being displayed and associated with the colorimetric position data and the illumination light data. The imaging apparatus 13 also performs the color correction (color balance adjusting process) by the color correction unit 16 using the entire illumination light data on the entire image data associated with the entire illumination light data. Then, the imaging apparatus 13 displays the corrected image data on the image display/colorimetric position acquisition unit 7 (S49), and returns control to S41. When there is a new capture instruction or a display instruction, the processes in S41 through S49 are performed on the image data associated with the instruction. When the processes in S41 through S49 are performed again on the image data being displayed on the image display/colorimetric position acquisition unit 7, new colorimetric position data, colorimetric data, and illumination light data are associated with the image data being displayed.

Thus, the color correction is made to the colorimetric part using the colorimetric data acquired near the light source 9, thereby correcting the color of the colorimetric part independent of the external light. Furthermore, since the color correction is made to the colorimetric part using the illumination light data acquired near the colorimetric part, the color of the object at the colorimetric part can be approached to what is seen by human eyes. In addition, since the color correction is performed on the image data using the entire illumination light data, the appearance of the entire image data can be improved.

FIGS. 10A through 10H are examples of the operations of the user who operates the imaging apparatus 13 according to the second embodiment.

Figure 10A:
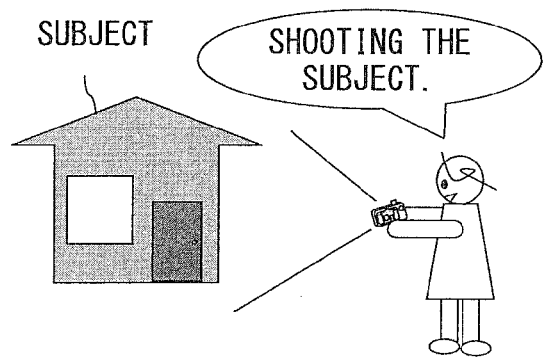
FIG. 10A is an explanatory view of an operation of a user who operates the imaging apparatus according to the second embodiment.
Figure 10B:
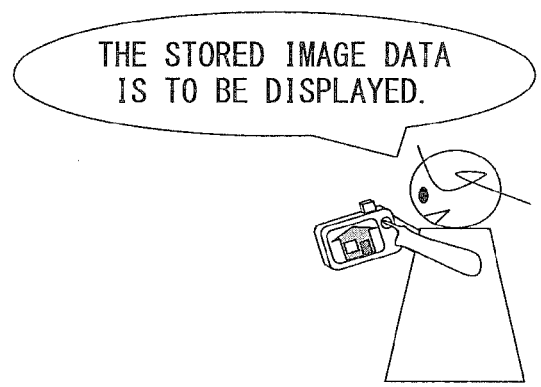
FIG. 10B is an explanatory view of an operation of a user who operates the imaging apparatus according to the second embodiment.
Figure 10C:
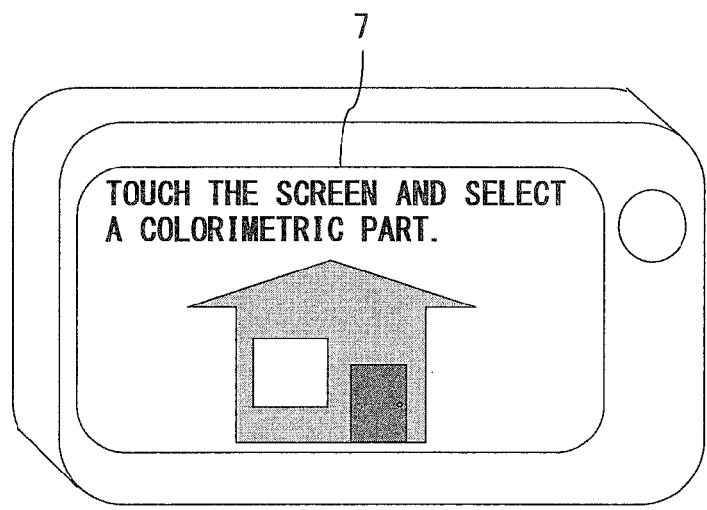
FIG. 10C is an explanatory view of an operation of a user who operates the imaging apparatus according to the second embodiment.

As illustrated in FIG. 10A, the user captures a "house" as a subject by, for example, pressing a release button not illustrated in the attached drawings. Otherwise, as illustrated in FIG. 10B, a user selects the image data obtained by shooting the "house" from the image data stored on the storage unit 12 as the image data to be displayed on the image display/colorimetric position acquisition unit 7. Then, the image data A as illustrated in FIG. 10C is displayed on the image display/colorimetric position acquisition unit 7. In this case, as a message for allowing the user to select a colorimetric part, for example, as illustrated in FIG. 10C, the message "Touch the screen and select a colorimetric part." can be displayed on the image display/colorimetric position acquisition unit 7.

Figure 10D:
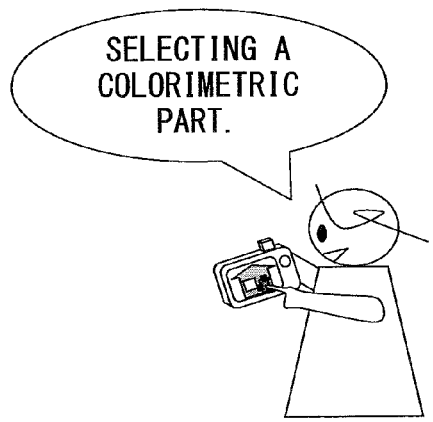
FIG. 10D is an explanatory view of an operation of a user who operates the imaging apparatus according to the second embodiment.
Figure 10E:
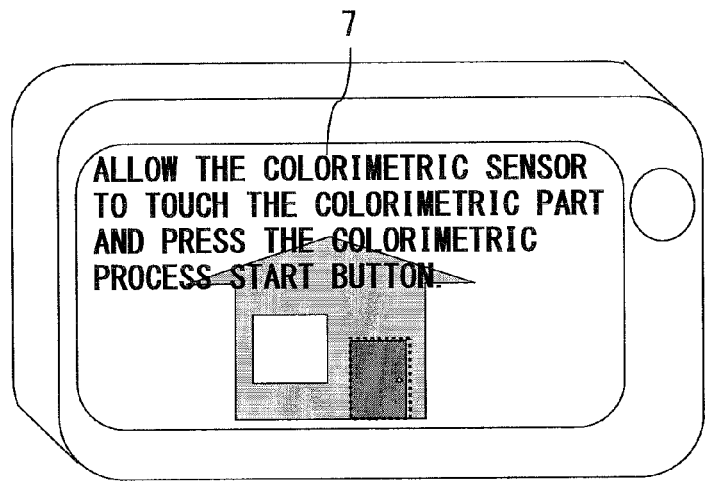
FIG. 10E is an explanatory view of an operation of a user who operates the imaging apparatus according to the second embodiment.

Next, as illustrated in FIG. 10D, the user selects the "door" as a colorimetric part in the image data A displayed on the image display/colorimetric position acquisition unit 7 by touching the "door" by his or her finger. Then, the image display/colorimetric position acquisition unit 7 acquires the colorimetric position data A1 corresponding to the "door", and the colorimetric position data A1 is recorded on the colorimetric position data memory 8. In this case, for example, as illustrated in FIG. 10E, the colorimetric part selected by the user can be enclosed by broken lines. The user can confirm by the broken lines that the "door" has been selected as a colorimetric part. As a message for allowing the user to start the colorimetric process, for example, as illustrated in FIG. 10E, the message "Allow the colorimetric sensor to touch the colorimetric part and press the colorimetric process start button." can be displayed on the image display/colorimetric position acquisition unit 7.

Figure 10F:
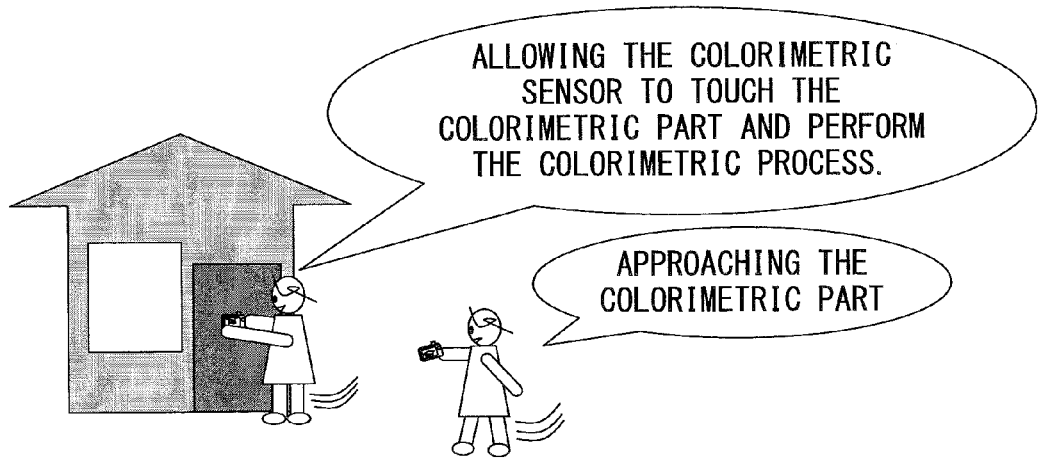
FIG. 10F is an explanatory view of an operation of a user who operates the imaging apparatus according to the second embodiment.
Figure 10G:
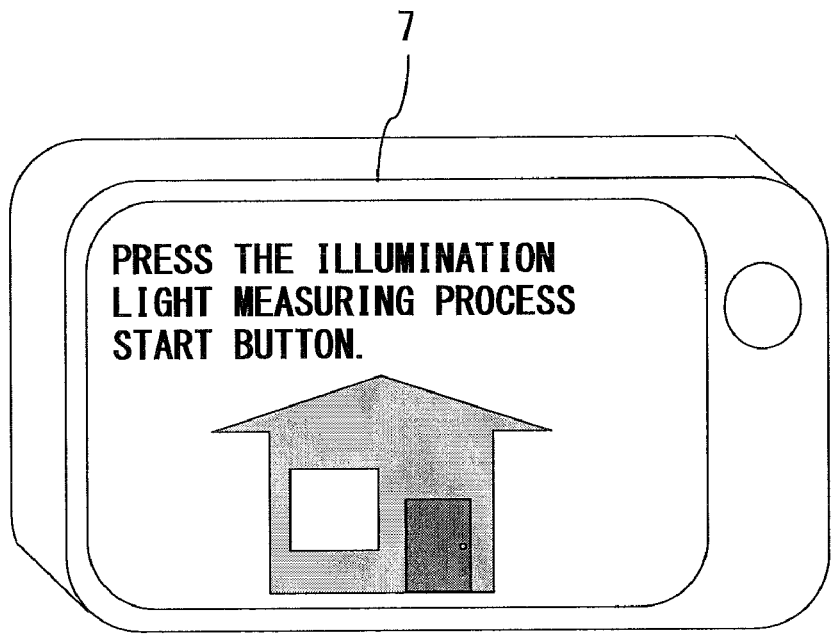
FIG. 10G is an explanatory view of an operation of a user who operates the imaging apparatus according to the second embodiment.

Next, as illustrated in FIG. 10F, After approaching the "door", the user allows the colorimetric sensor 10 to touch the "door", and presses the colorimetric process start button not illustrated in the attached drawings. Then, the colorimetric data A1 is acquired by the colorimetric sensor 10, and the colorimetric data A1 is recorded on the colorimetric data memory 11. In this case, for example, as a message for allowing the user to start the illumination light measuring process, the message "Press the illumination light measuring process start button." can be displayed on the image display/colorimetric position acquisition unit 7 as illustrated in FIG. 10G.

Figure 10H:
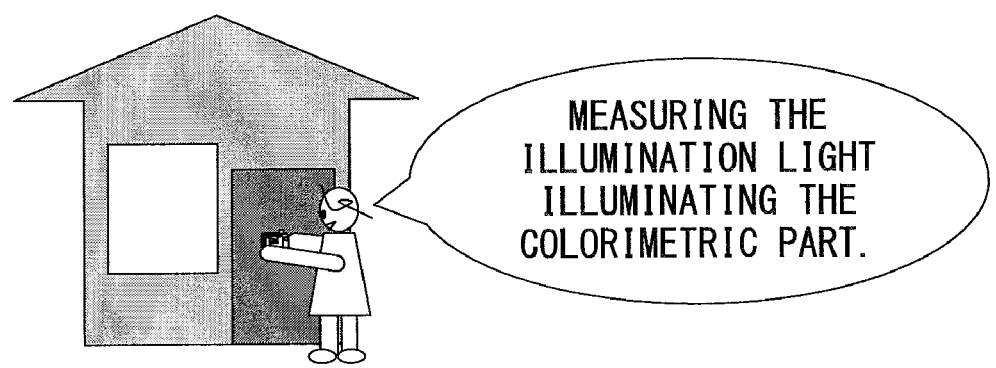
FIG. 10H is an explanatory view of an operation of a user who operates the imaging apparatus according to the second embodiment.

Next, as illustrated in FIG. 10H, the user presses the illumination light measuring process start button not illustrated in the attached drawings near the "door". Then, the illumination light data A1 is acquired by the illumination sensor 14, and the illumination light data A1 is recorded on the illumination light data memory 15.

Thus, the image data A, the colorimetric position data A1, the colorimetric data A1, and the illumination light data A1 are associated with one another, and stored on the storage unit 12.

Afterwards, when a new colorimetric part in the same image data A is selected by the user, the colorimetric position data A2 corresponding to the colorimetric part is recorded on the colorimetric position data memory 8. Then, if the user presses the colorimetric process start button, the colorimetric data A2 is recorded on the colorimetric data memory 11. Then, if the user presses the illumination light measuring process start button, the illumination light data A2 is recorded on the illumination light data memory 15. Then, the image data A, the colorimetric position data A2, the colorimetric data A2, and the illumination light data A2 are associated with one another, and stored on the storage unit 12.

When the user selects a colorimetric part of different image data B, the colorimetric position data B1 corresponding to the colorimetric part is recorded on the colorimetric position data memory 8. When the user presses the colorimetric process start button, the colorimetric data B1 is recorded on the colorimetric data memory 11. If the user presses the illumination light measuring process start button, the illumination light data B2 is recorded on the illumination light data memory 15. Then, the image data B, the colorimetric position data B1, the colorimetric data B1, and the illumination light data B1 are associated with one another, and stored on the storage unit 12.

Figure 11A:
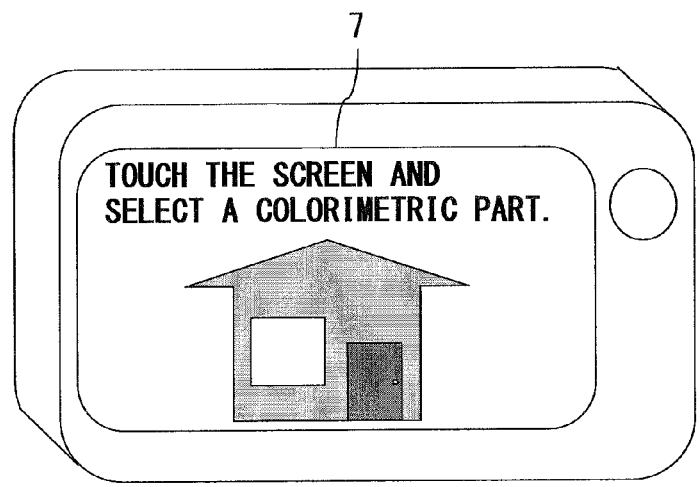
FIG. 11A is an explanatory view of another operation of a user who operates the imaging apparatus according to the second embodiment.

FIGS. 11A through 11E are explanatory views of the operation of the user when only colorimetric data is changed. It is assumed that the image data A as illustrated in FIG. 11A is displayed on the image display/colorimetric position acquisition unit 7.

Figure 11B:
FIG. 11B is an explanatory view of another operation of a user who operates the imaging apparatus according to the second embodiment.
Figure 11C:
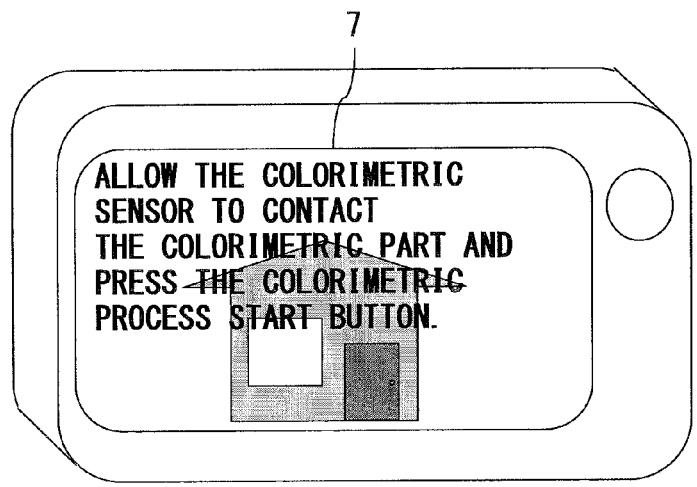
FIG. 11C is an explanatory view of another operation of a user who operates the imaging apparatus according to the second embodiment.

First, as illustrated in FIG. 11B, the user selects the "door" as a colorimetric part whose colorimetric data is to be changed in the image data A displayed on the image display/colorimetric position acquisition unit 7 by touching the "door" by his or her finger. Then, the image display/colorimetric position acquisition unit 7 acquires the colorimetric position data A1 corresponding to the "door", and the colorimetric position data A1 is recorded on the colorimetric position data memory 8. In this case, as a message for allowing the user to start a colorimetric process, for example, as illustrated in FIG. 11C, the message "Allow the colorimetric sensor to touch the colorimetric part and press the colorimetric process start button." is displayed on the image display/colorimetric position acquisition unit 7.

Then, as illustrated in FIG. 11D, the user allows the colorimetric sensor 10 to touch the "door" different from the "door" of the image data A, and presses the colorimetric process start button not illustrated in the attached drawings. Then, the colorimetric data A2 is acquired by the colorimetric sensor 10, and the colorimetric data A2 is recorded on the colorimetric data memory 11. In this case, since the colorimetric process is not performed on the illumination light, the storage unit 12 associates and stores the image data A, the colorimetric position data A1, the colorimetric data A2, and the illumination light data A1 as associated with one another. In the color correction unit 16, the color correction is made to the colorimetric part corresponding to the colorimetric position data A1 of the image data A based on the colorimetric data A2 and the illumination light data A1, and the color corrected image data A is displayed on the image display/colorimetric position acquisition unit 7 as illustrated in FIG. 11E.

Thus, only the colorimetric data in the acquired image data can be changed. Therefore, for example, the user shoots the door in the house, and then goes to a shop of doors and performs the colorimetric process on a new door, thereby confirming the color of the new door in the illumination environment of the house while checking the image data displayed on the image display/colorimetric position acquisition unit 7, and successfully purchasing a door matching the illumination light of the house.

Figure 12A:
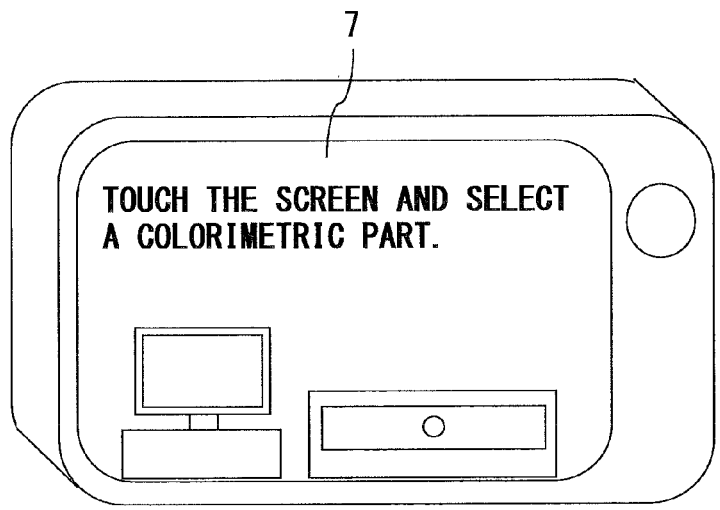
FIG. 12A is an explanatory view of a further operation of a user who operates the imaging apparatus according to the second embodiment.

FIGS. 12A through 12E are explanatory views of the operation of the user when only illumination light data is changed. It is assumed that the image data B as illustrated in FIG. 12A is displayed on the image display/colorimetric position acquisition unit 7.

Figure 12B:
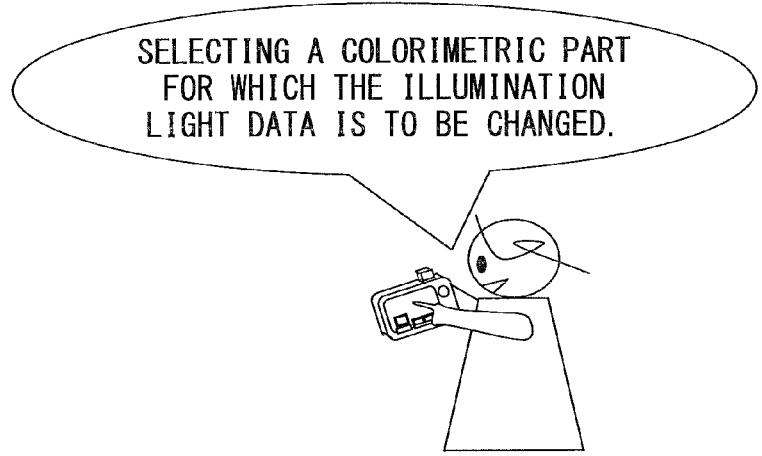
FIG. 12B is an explanatory view of a further operation of a user who operates the imaging apparatus according to the second embodiment.
Figure 12C:
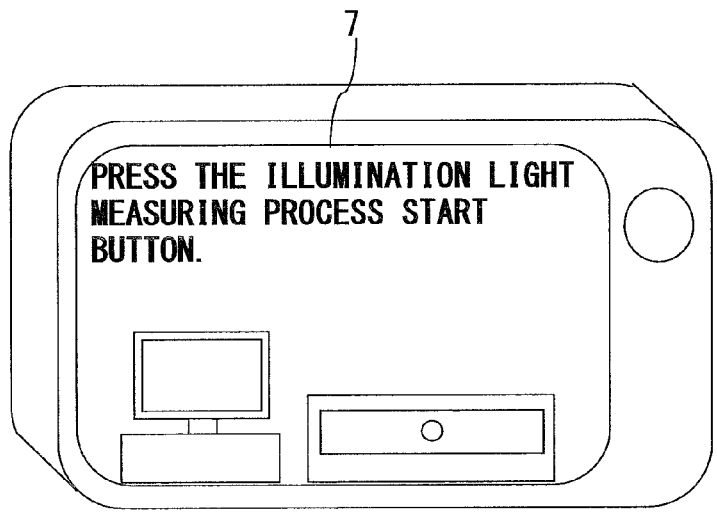
FIG. 12C is an explanatory view of a further operation of a user who operates the imaging apparatus according to the second embodiment.

First, as illustrated in FIG. 12B, the user selects the "wall paper" as a colorimetric part whose illumination light data is to be changed in the image data B displayed on the image display/colorimetric position acquisition unit 7 by touching the "wall paper" by his or her finger. Then, the image display/colorimetric position acquisition unit 7 acquires the colorimetric position data B1 corresponding to the "wall paper", and the colorimetric position data B1 is recorded on the colorimetric position data memory 8. In this case, as a message for allowing the user to start a illumination light measuring process, for example, as illustrated in FIG. 12C, the message "Press the illumination light measuring process start button." is displayed on the image display/colorimetric position acquisition unit 7.

Figure 12D:
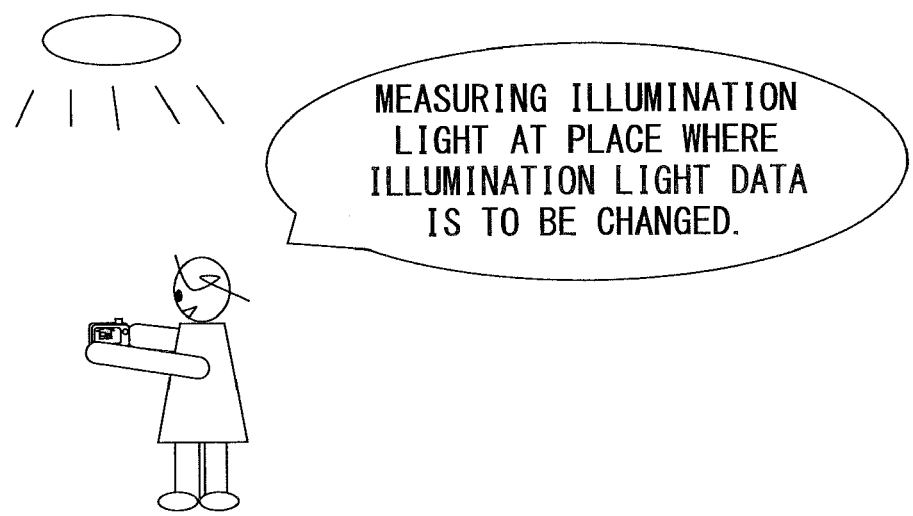
FIG. 12D is an explanatory view of a further operation of a user who operates the imaging apparatus according to the second embodiment.
Figure 12E:
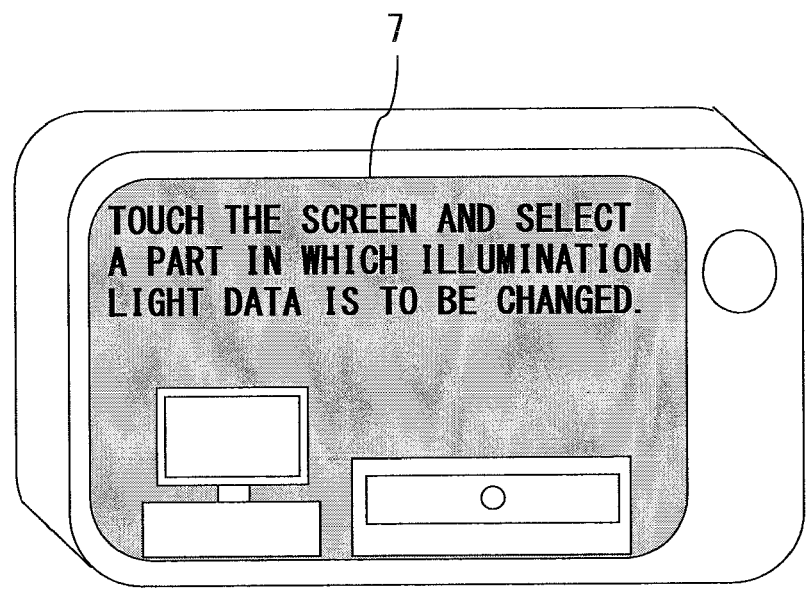
FIG. 12E is an explanatory view of a further operation of a user who operates the imaging apparatus according to the second embodiment.

Then, as illustrated in FIG. 12D, the user presses the illumination light measuring process start button not illustrated in the attached drawings under a new illumination unit. Then the illumination light data B2 is acquired by the illumination sensor 14, and the illumination light data B2 is recorded on the illumination light data memory 15. In this case, the colorimetric process is not performed. Therefore, the storage unit 12 stores the image data B, the colorimetric position data B1, the colorimetric data B1, and the illumination light data B2 as associated with one another. In the color correction unit 16, the color correction is made to the colorimetric part corresponding to the colorimetric position data B1 of the image data B based on the colorimetric data B1 and the illumination light data B2, and the color corrected image data B is displayed on the image display/colorimetric position acquisition unit 7 as illustrated in FIG. 12E.

Thus, only the illumination light data of the colorimetric part in the acquired image data can be changed. Therefore, for example, the user shoots the wall paper in the house, and then goes to a shop of illumination unit and performs the illumination light measuring process under the new illumination unit, thereby confirming the color of the wall paper with the new illumination unit while checking the image data displayed on the image display/colorimetric position acquisition unit 7, and successfully purchasing an illumination unit matching the color of the wall paper of the house.

According to the imaging apparatus 13 of the second embodiment, a user selects a colorimetric part of the image data displayed on the image display/colorimetric position acquisition unit 7, and then allows the colorimetric sensor 10 to touch the colorimetric part only to perform the colorimetric process and the illumination light measuring process, thereby the colorimetric part, the colorimetric data, and the illumination light data of the image data can be associated with one another and stored on the storage unit 12. Thus, according to the imaging apparatus 13 of the second embodiment, the colorimetric part, the chromatic information, and the illumination information of the captured image can be associated with one another with a simple configuration. In addition, according to the imaging apparatus 13 of the second embodiment, a color correction can be made by the imaging apparatus 13 as a single unit with a simple configuration. Therefore, the color of the subject can be correctly reproduced.

Third Embodiment

Figure 13:
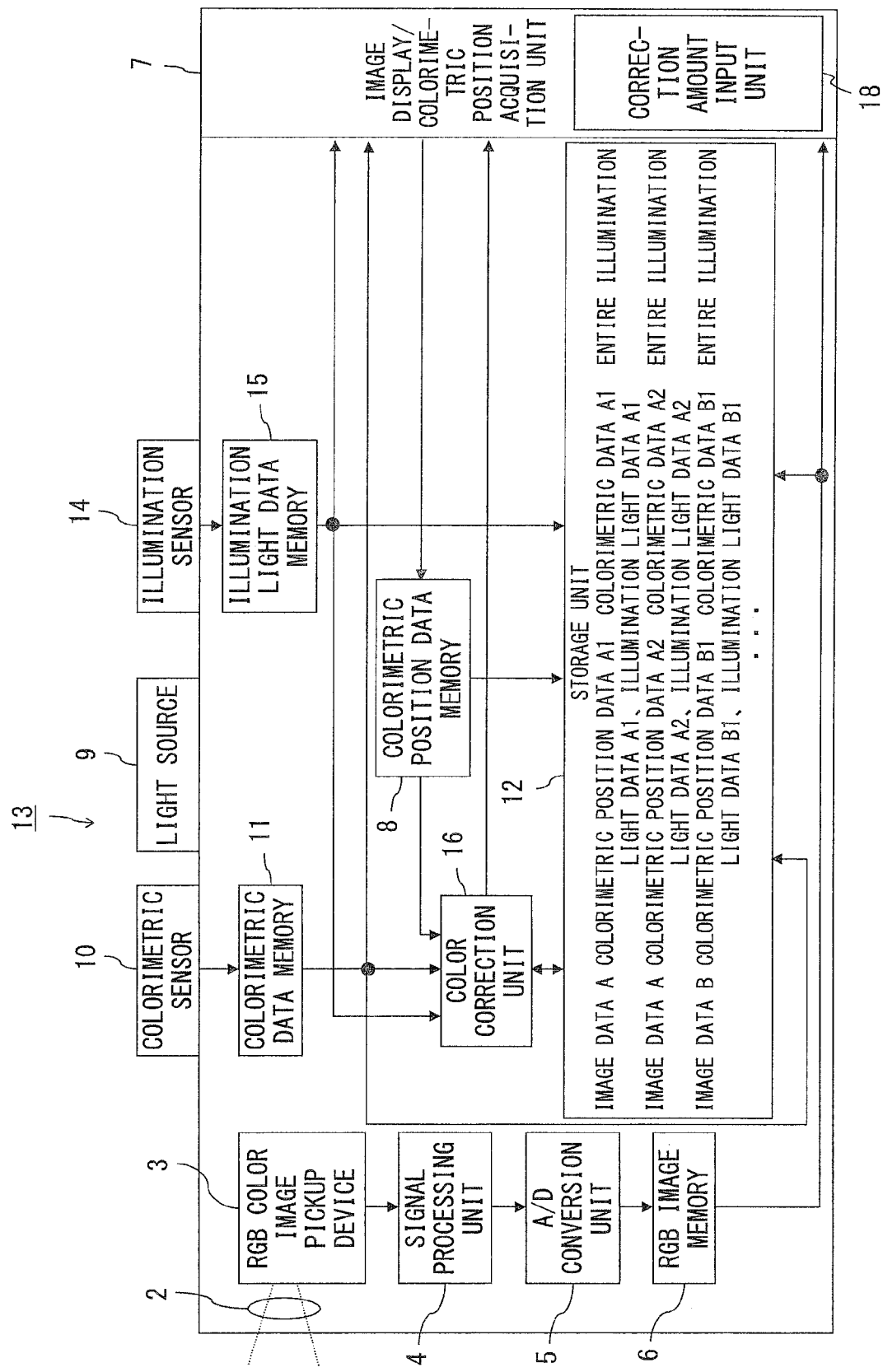
FIG. 13 illustrates the imaging apparatus according to the third embodiment of the present invention.

FIG. 13 illustrates the imaging apparatus according to the third embodiment. The same configuration as the configuration illustrated in FIG. 8 is assigned the same reference numeral.

The characteristic of an imaging apparatus 17 illustrated in FIG. 13 is that a correction amount input unit 18 is provided for the image display/colorimetric position acquisition unit 7.

The correction amount input unit 18 receives the amounts of correction of the tint, the color saturation, and the lightness of the image data when a color correction is made by the operation of a user. Each amount of correction input to the correction amount input unit 18 is transmitted to the color correction unit 16. The color correction unit 16 adjusts the amounts of correction of the tint, the color saturation, and the lightness of the image data when a color correction is made based on each amount of correction transmitted from the correction amount input unit 18. The image data color-corrected by the color correction unit 16 after the amount of correction is adjusted is stored on the storage unit 12, and displayed on the image display/colorimetric position acquisition unit 7.

According to the imaging apparatus 17 of the third embodiment, a user can adjust the entire appearance of the image data while checking the image data displayed on the image display/colorimetric position acquisition unit 7.

According to the present invention, a single unit of imaging apparatus can associate the colorimetric part with the chromatic information about a captured image with a simple configuration.

What is claimed is:

1. An imaging apparatus, comprising:
an imaging unit acquiring color image data of a subject;
a display unit displaying the image data acquired by the imaging unit;
a colorimetric position acquisition unit acquiring colorimetric position data corresponding to a colorimetric part selected by a user in the image data displayed on the displayunit;
a colorimetric position data record unit recording the colorimetric position data;
a light source;
a colorimetric unit provided near the light source, performing a colorimetric process at a colorimetric instruction from the user, and acquiring colorimetric data as a result of the colorimetric process;
a colorimetric data record unit recording the colorimetric data;
an illumination light measuring unit measuring illumination light at an illumination light measure instruction from a user, and acquiring illumination light data as a result of measurement;
an illumination light data record unit recording the illumination light data; and
a storage unit associating the image data displayed on the display unit, the colorimetric position data recorded on the colorimetric position data record unit, and the colorimetric data recorded on the colorimetric data record unit, and storing the data,
wherein the storage unit stores the image data displayed on the display unit, the colorimetric position data recorded on the colorimetric position data record unit, the colorimetric data recorded on the colorimetric data record unit; and the illumination light data recorded on the illumination light data record unit after associating the data with one another.

2. The imaging apparatus according to claim 1, further comprising a color correction unit performing a color correction on a colorimetric part of the image data corresponding to the colorimetric position data based on the colorimetric data and the illumination light data affected part by the illumination light measuring unit when the colorimetric data is acquired by the colorimetric unit.

3. The imaging apparatus according to claim 2, wherein the color correction unit performs a color correction on the image data based on the illumination light data detected by the illumination light measuring unit when the image data is shot by the imaging unit.

4. The imaging apparatus according to claim 2, further comprising a color correction amount input unit receiving an amount of color correction from a user, wherein the color correction unit performs a color correction on the image data based on the amount of color correction input by the color correction amount input unit.

5. The imaging apparatus according to claim 1, wherein:
the imaging unit comprises an image pickup device for converting a subject image into an electric signal; and
the colorimetric unit acquires more spectral information than the image pickup device.

6. The imaging apparatus according to claim 1, wherein:
the imaging unit comprises an image pickup device for converting a subject image into an electric signal; and
the illumination light measuring unit acquires more spectral information than the image pickup device.

7. The imaging apparatus according to claim 1, wherein the colorimetric unit is a spectral colorimeter or a chromatic colorimeter.

8. The imaging apparatus according to claim 1, wherein the illumination light measuring unit is a spectral colorimeter or a chromatic colorimeter.

9. The imaging apparatus according to claim 1, wherein the display unit is a touch panel.

* * * * *